United States Patent
Wolfe et al.

(10) Patent No.: US 11,210,434 B2
(45) Date of Patent: Dec. 28, 2021

(54) FAULT ISOLATION

(71) Applicant: Textron Innovations Inc., Providence, RI (US)

(72) Inventors: Monty Allan Wolfe, Keller, TX (US); Marc Lemieux, Quebec (CA); Michael Alan Gralish, Arlington, TX (US)

(73) Assignee: Textron innovations Inc., Providence, RI (US)

( * ) Notice: Subject to any disclaimer, the term of this patent is extended or adjusted under 35 U.S.C. 154(b) by 366 days.

(21) Appl. No.: 15/786,464

(22) Filed: Oct. 17, 2017

(65) Prior Publication Data

US 2019/0114387 A1    Apr. 18, 2019

(51) Int. Cl.

| G06F 30/15   | (2020.01) |
| G06F 3/0481  | (2013.01) |
| G06F 16/93   | (2019.01) |
| B64F 5/40    | (2017.01) |
| B64F 5/60    | (2017.01) |
| G06F 3/0482  | (2013.01) |
| G06Q 30/06   | (2012.01) |
| G06F 111/02  | (2020.01) |

(52) U.S. Cl.
CPC ............... *G06F 30/15* (2020.01); *B64F 5/40* (2017.01); *B64F 5/60* (2017.01); *G06F 3/04815* (2013.01); *G06F 16/94* (2019.01); *G06F 3/0482* (2013.01); *G06F 2111/02* (2020.01); *G06Q 30/0641* (2013.01)

(58) Field of Classification Search
CPC .... B64F 5/40; B64F 5/60; G06F 16/94; G06F 17/5095; G06F 2217/04; G06F 3/04815; G06F 3/0482; G06Q 30/0641
See application file for complete search history.

(56) References Cited

U.S. PATENT DOCUMENTS

| 8,788,138 | B1 * | 7/2014 | Yogesha | ............ G05B 23/0272 |
| | | | | 701/29.1 |
| 2007/0241908 | A1 | 10/2007 | Coop | |
| 2008/0307327 | A1 * | 12/2008 | Newcomer | ............. G06T 19/20 |
| | | | | 715/757 |
| 2010/0042283 | A1 * | 2/2010 | Kell | ....................... G06Q 10/06 |
| | | | | 701/29.3 |

(Continued)

FOREIGN PATENT DOCUMENTS

| CN | 101681160 A | 3/2010 |
| CN | 103625650 A | 3/2014 |

(Continued)

*Primary Examiner* — Kamini S Shah
*Assistant Examiner* — Peter Pham
(74) *Attorney, Agent, or Firm* — Slater Matsil LLP

(57) ABSTRACT

A system includes an input/output interface, a processor, and a non-transitory computer-readable medium having instructions stored thereon. The instructions, when executed, cause the processor to receive a fault code, display on the input/output interface a first component of an aircraft that is associated with the fault code, upon selection by a user of a first hyperlink associated with the first component, display a physical layout of the aircraft in which the first component is indicated, and upon selection by the user of a second hyperlink associated with the first component, display a first wiring diagram of the aircraft in which the first component is indicated.

20 Claims, 11 Drawing Sheets

(56) References Cited

U.S. PATENT DOCUMENTS

| | | | |
|---|---|---|---|
| 2010/0063754 A1* | 3/2010 | Thomas | G01R 31/086 |
| | | | 702/59 |
| 2010/0198431 A1 | 8/2010 | Corbefin | |
| 2014/0058594 A1 | 2/2014 | Plowman et al. | |
| 2016/0054889 A1* | 2/2016 | Hadley | G06F 3/04815 |
| | | | 715/849 |
| 2016/0055665 A1* | 2/2016 | Floyd | G09G 5/02 |
| | | | 345/419 |
| 2017/0134087 A1* | 5/2017 | Law | H04B 7/18506 |

FOREIGN PATENT DOCUMENTS

| | | |
|---|---|---|
| CN | 105389321 A | 3/2016 |
| EP | 1503301 A2 | 2/2005 |
| EP | 2770391 A1 | 8/2014 |
| GB | 2449974 A | 12/2008 |

\* cited by examiner

FAULT ISOLATION

TECHNICAL FIELD

Representative embodiments generally relate to a system and method for assisting a user in fault isolation or maintenance of an aircraft; and, in particular embodiments, to a system and method for incorporating logical layout and physical layout of components associated with a fault.

BACKGROUND

As aircraft increase in complexity and number of components, the number of potential faults increases correspondingly. For example, a fly-by-wire (FBW) aircraft may have many more components than a similar manually-controlled aircraft, and thus potentially many more possible faults that can be identified. Given a particular fault, procedures for isolating a fault and performing correlated maintenance can be complicated and difficult. For example, locations of specific components on an aircraft or within a wiring diagram may be difficult to determine.

SUMMARY

According to an embodiment, a system includes an input/output interface, a processor, and a non-transitory computer-readable medium having instructions stored thereon. The instructions, when executed, cause the processor to receive a fault code, display on the input/output interface a first component of an aircraft that is associated with the fault code, upon selection by a user of a first hyperlink associated with the first component, display a physical layout of the aircraft in which the first component is indicated, and upon selection by the user of a second hyperlink associated with the first component, display a first wiring diagram of the aircraft in which the first component is indicated.

According to another embodiment, a method includes receiving, at a remote terminal, a fault code for an aircraft, receiving, at the remote terminal and from a server, a data module of a multiple of data modules, and displaying the data module in an interface of the remote terminal, including displaying one or more user-selectable links within the data module to one or more other data modules of the multiple data modules. The plurality of data modules includes a first data module associated with the fault code and a second data module associated with a component of the aircraft.

According to another embodiment, a method includes displaying a 3D model of an aircraft on a computing system, wherein the displayed view of the 3D model is controllable by a user of the computing system. The 3D model includes a first set of aircraft components including at least one aircraft component. The first set of aircraft components is visually distinguished from other aircraft components in the 3D model. Each component of the first set of aircraft components is selectable by the user of the computing system within the 3D model. The method also includes, upon selection of a first aircraft component of the first set of aircraft components within the 3D model, displaying an interactive wiring diagram of the aircraft, wherein at least a first aircraft component of the first set of aircraft components is visually distinguished from a second aircraft component of the first set of aircraft components in the interactive wiring diagram.

In some cases, an Interactive Electronic Technical Manual (IETM) described herein can improve efficiency and accuracy of tasks such as fault isolation, fault repair, routine maintenance, or the like. For example, use of the IETM may improve a cycle time to troubleshoot maintenance tasks. In some cases, use of the interactive logical layout of the IETM can reduce a time for an average wire trouble-shooting task by as much as about 30%. Moreover, as an airframe ages, frequency of wiring-related troubleshooting generally increases. For every 1000 hours of flight time, an interactive logical layout can save as much as about 100 hours of reduced maintenance, and thus improve an aircraft's availability to fly. Use of an interactive physical layout in conjunction with an interactive logical layout may reduce a number of incorrect fault isolation diagnoses, and may reduce a number of unnecessary maintenance procedures performed on an aircraft.

BRIEF DESCRIPTION OF THE DRAWINGS

For a more complete understanding of representative embodiments, and advantages thereof, reference is now made to the following descriptions taken in conjunction with the accompanying drawings, in which.

DETAILED DESCRIPTION OF ILLUSTRATIVE EMBODIMENTS

Figure 1:
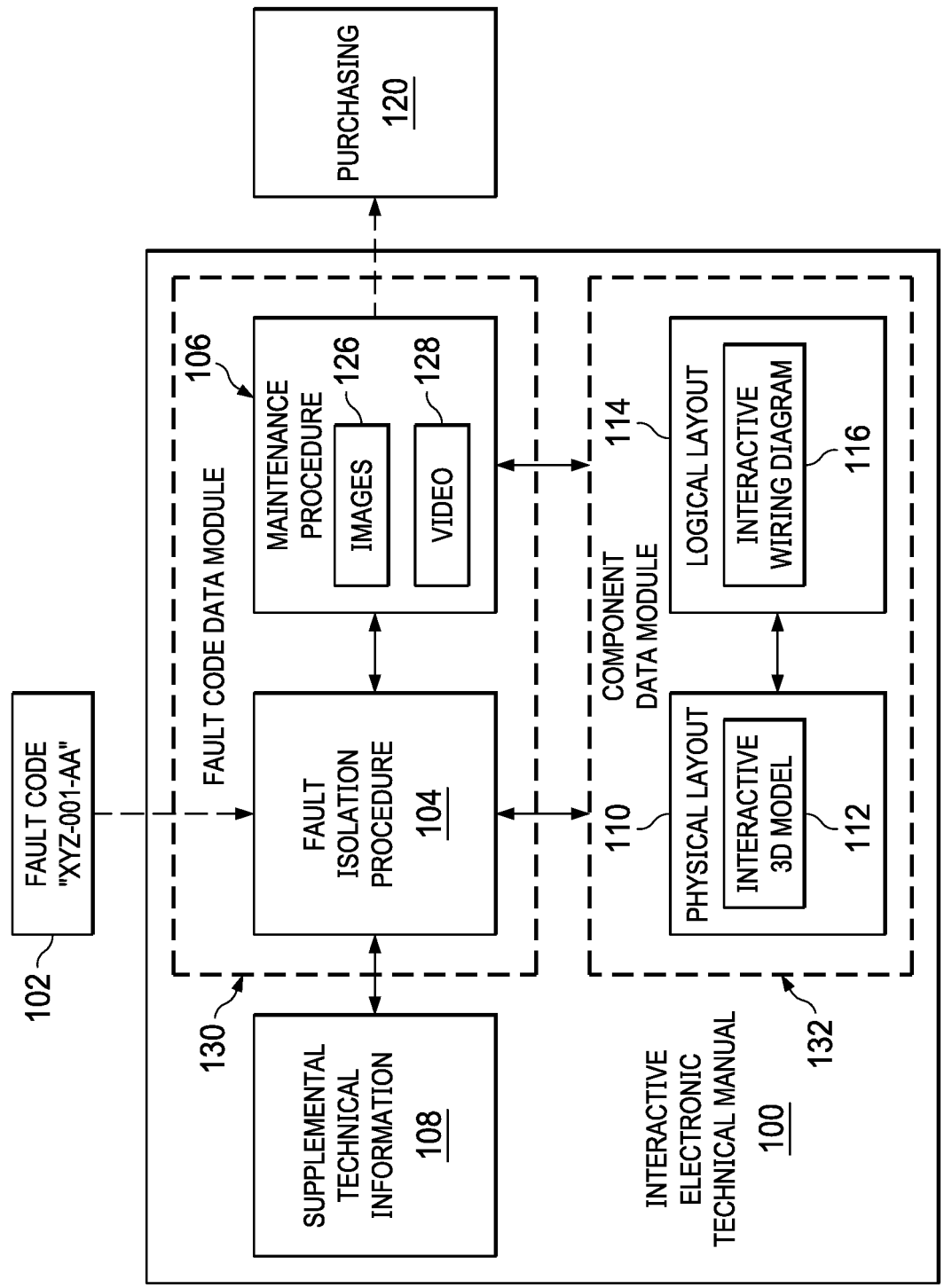
FIG. 1 representatively illustrates a schematic of an Interactive Electronic Technical Manual system (IETM) according to some embodiments.

Representative embodiments of systems and methods of the present disclosure are described below. In the interest of clarity, features of an actual implementation may not be described in this specification. It will of course be appreciated that in development of any such actual embodiment, numerous implementation-specific decisions may be made to achieve a developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to spatial relationships between various components and to spatial orientation of various aspects or components of devices illustrated in the drawings. However, as will be recognized by those skilled in the art, devices, members, apparatuses, or the like, described herein may be positioned in any desired orientation. Thus, use of terms such as "above," "below," "upper," "lower," or other contextually similar terms to describe a spatial relationship between various components, or to describe spatial orientation of aspects of such components, should be understood to describe a relative relationship between components, or a spatial orientation of aspects of such components, respectively, as devices described herein may be oriented in any desired direction.

In some cases, sensors, logic, or circuitry within an aircraft are able to detect a fault of an aircraft component. For example, a fault may be detected by a sensor, a Flight Control Computer (FCC) or an avionics system of the aircraft. The aircraft may store a list of fault events that occur during operation, which includes fault information such as a time, affected component, aircraft state, and a fault code that is uniquely associated with each particular type of fault. Based on these fault codes, a technician can follow a fault isolation procedure to determine cause(s) of the fault or the given maintenance procedure to remedy the fault. The present disclosure describes an Interactive Electronic Technical Manual (IETM) that a user (e.g., a maintenance technician) can use to look up information associated with a fault code, such as a fault isolation procedure and maintenance procedure. In some embodiments, the IETM described herein is able to present fault information, component information, physical location information, and wiring diagrams in a cross-linked and interactive interface. For example, a user may be able to select a component in a wiring diagram and be shown a physical location of a component on the aircraft, or vice versa.

FIG. 1 illustrates a schematic diagram of an Interactive Electronic Technical Manual (IETM) 100 according to some embodiments. IETM 100 is a system for interactively presenting a user with information related to fault codes of an aircraft. Information presented may include component descriptions, fault isolation procedures, maintenance procedures, supplemental technical information, physical layouts of aircraft components, logical layouts of aircraft components, or other information. IETM 100 includes cross-referenced hyperlinks between fault isolation procedures, components, physical layouts, and logical layouts that can allow a user to easily access different types of information. A fault code can be input into IETM 100, and IETM 100 can present different types of information related to that specific fault code, such as information related to components or systems associated with the fault code. An example single fault code 102 is shown in FIG. 1 as being input into IETM 100, though IETM 100 may have relevant information for all or a substantial portion of fault codes of an aircraft. IETM 100 may be displayed or presented on, for example, computing system 202 with a user interface (UI), and is described in greater detail below with respect to FIG. 2. The fault codes (e.g., fault code 102) may be input into IETM 100 manually (e.g., typed in a field by a user, selected by the user from a list, or the like), transferred wirelessly from the aircraft over a network, transferred via a portable storage medium (e.g., a USB "memory stick," or the like), or by any other technique, whether now known or hereafter derived in the art.

Figure 2:
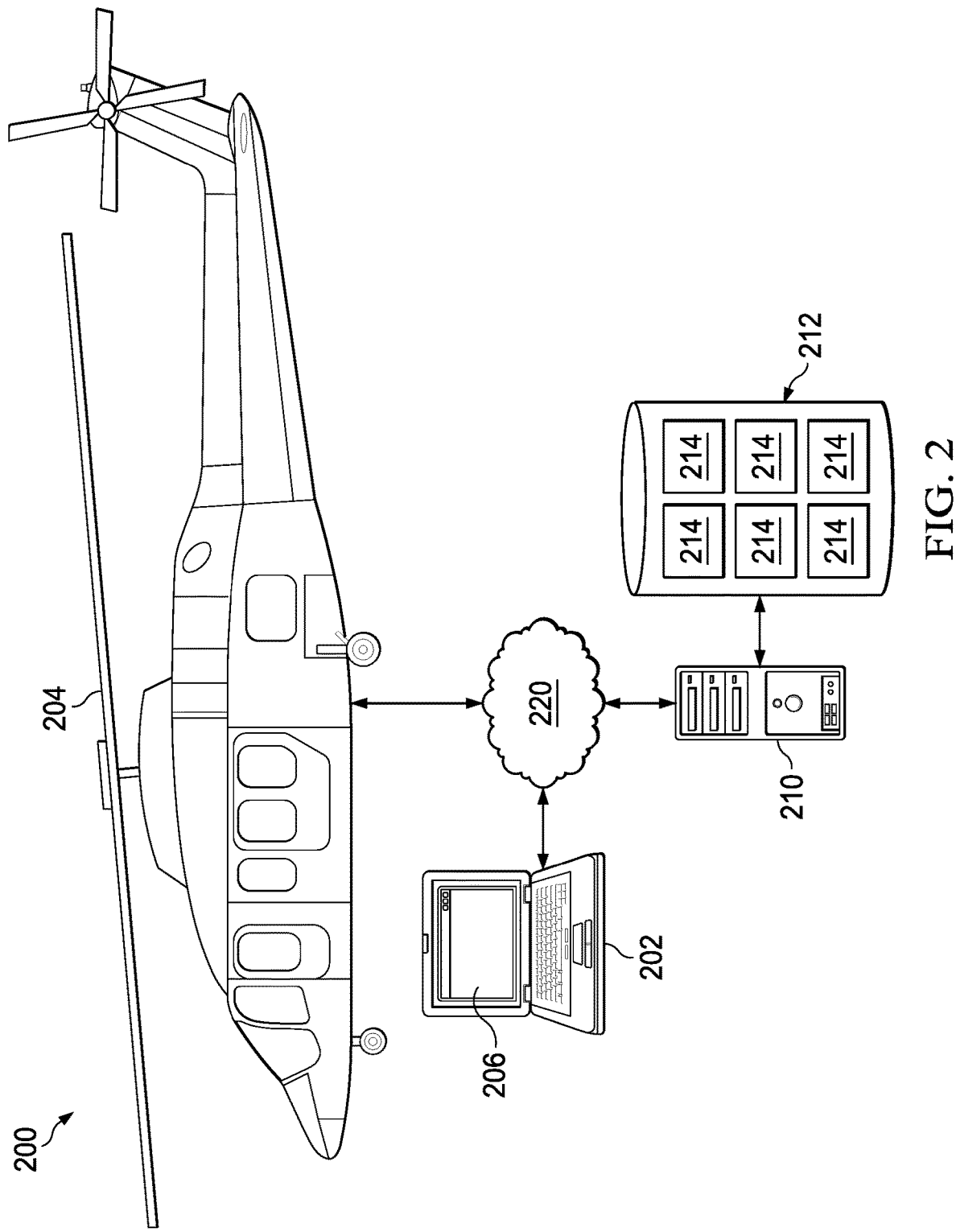
FIG. 2 representatively illustrates a system for implementing an IETM according to some embodiments.

FIG. 2 illustrates system 200 for implementing IETM 100 according to some embodiments. System 200 includes computer system 202 through which a user may access and interact with IETM 100. Computer system 202 may be a computing device, such as a personal computer, a lap top, a tablet computer, a smartphone, or other type computing device. In some embodiments, computer system 202 may be a remote terminal. In some embodiments, a user may interact with IETM 100 via interface 206, such as a web page or web application within a web browser running on computer system 202. In some cases, a web page or web application for IETM 100 may include portions created in JavaScript, Hypertext Markup Language (HTML, HTML5, or the like), WebGL, or other suitable platforms. In some embodiments, a user may interact with IETM 100 via a native application running on computer system 202.

System 200 also includes server 210 that is configured to communicate with user's computing system 202 via network 220. System 200 may include more than one server. In some cases, server 210 is connected to data storage system 212 that stores information 214 associated with IETM 100, which is communicated by server 210 to computer system 202. In some embodiments, information 214 is stored as discrete data modules, described in greater detail below. Network 220 may include a local area network (LAN), a wide area network (WAN), a telephone network, an intranet, the Internet, a wireless network, other types of networks, a combination of networks, or the like. In some cases, aircraft 204 may be connected to network 220, and may be able to transfer fault codes and related information to computer system 202 or server 210.

As representatively illustrated in FIG. 1, IETM 100 includes different types of information within different modules that may be presented interactively to a user. IETM 100 includes fault isolation procedure module 104 that is associated with example fault code 102. A single representative fault isolation procedure module 104 is shown schematically in FIG. 1, although IETM 100 may contain many different fault isolation procedures. As representatively shown in FIG. 1, example fault isolation procedure module 104 is associated with an example fault code 102, but in some cases a single fault isolation procedure may be associated with one or more different fault codes. Fault isolation procedure module 104 may, for example, include investigative tools such as a binary fault isolation procedure, in which a user is given a series of yes-or-no questions to narrow down a possible mechanical or electrical cause(s) of the fault code. Once fault isolation procedure module 104 is completed by a user, the interface may direct the user to maintenance procedure module 106 that is connected to fault isolation procedure module 104. The example maintenance procedure module 106 is described in greater detail below. Fault isolation procedure module 104 may be connected to maintenance procedure module 106 by, for example, a selectable hyperlink or other suitable UI feature. In other embodiments, fault isolation procedure module 104 may use other techniques, and may include media such as images or video. Fault isolation procedure module 104 may also contain connections to one or more physical layouts and one or more logical layouts of components, described in greater detail below.

IETM 100 also includes maintenance procedure module 106 associated with fault code 102. A representative maintenance procedure module 106 is shown schematically in FIG. 1, though IETM 100 may contain many different maintenance procedures or procedure modules. Maintenance procedure module 106 may, for example, include a procedure for component repair, component replacement, component inspection, component maintenance (including routine maintenance or periodic component maintenance), or the like. Maintenance procedure module 106 may be associated with one or more fault codes or one or more components. Additionally, a fault code or a component may have multiple different maintenance procedures associated with it. Maintenance procedure module 106 may be connected to one or more fault isolation procedures. Maintenance procedure module 106 may include media such as images 126 or video 128. In some cases, maintenance procedure module 106 may be connected to purchasing system 120, such that replacement components can be easily ordered, if, e.g., maintenance procedure module 106 includes procedures for component replacement.

Supplemental technical information module 108 shown schematically in FIG. 1 may include information, resources, or other materials that provide additional technical details or explanations relevant to a fault code, fault isolation procedure, maintenance procedure, component, or the like. Supplemental technical information 108 may, for example, include training materials, explanations of theory of operation, low-level descriptions of faults, components, or systems, or the like. Connections to relevant portions of supplemental technical information module 108 may be included within fault isolation procedure module 104, maintenance procedure module 106, within other portions of supplemental technical information module 108, or within other parts of IETM 100. In this manner, use of supplemental technical information module 108 can further a user's knowledge or understanding of a particular fault, component, or system.

IETM 100 also includes a physical layout module no that includes a physical layout for one or more components that may be presented to a user. In some cases, a particular component may be included in more than one physical layout. Physical layout module no may include an interactive 3D model 112 that shows or highlights location of a component in a 3D representation of the aircraft. Physical layout module no may also include media such as images or video. In some cases, a particular component or components included in physical layout module no may depend on a particular fault code or maintenance procedure, or on a particular connection selected by a user. In some embodiments, a component in physical layout module no presented to a user may be selected to then present a logical layout module 114 associated with the selected component.

IETM 100 also includes a logical layout module 114 that includes a logical layout for components of the aircraft. In some cases, logical layout 114 module may include more than one component, and a particular component may be included in more than one logical layout within IETM 100. Logical layout module 114 may include wiring diagrams or other types of electronic or computational schematics. Logical layout module 114 may include interactive wiring diagrams 116 that show or highlight a logical location of a component within a wiring diagram of the aircraft. Logical layout module 114 may also include component details that are presented to a user, such as a name or reference designation of a component, gauge, color, associated harness, capacity, termination codes, clocking, backshell or connector part numbers, wire length, harness notes, tooling details, identification of nomex braid, identification metal braid, identification of bare wire, wire bundle diameter, critical clamp markings, other repair information, or the like. In some embodiments, a component in logical layout module 114 that is presented to a user may be selected to then present a physical layout included in physical layout module 114 that is associated with the selected component.

As described above, fault isolation procedures, maintenance procedures, supplemental technical information, physical layouts, logical layouts, and other parts of IETM 100 are interconnected and presented to a user by an interactive interface. For example, a first aircraft component referenced in fault isolation procedure module 104 or in maintenance procedure module 106 or in supplemental technical information module 108 may be selected by the user (e.g., by clicking on a hyperlink, clicking on a picture of a component, selecting the component in a drop-down box, or the like). In response, the user can be presented with both a physical layout and a logical layout for a selected component. Moreover, within the physical layout and the logical layout for a first component, a second component may be selected, and associated fault isolation procedures, maintenance procedures, supplemental technical information, physical layouts, or logical layouts for the second component may be presented. In some cases, a component within IETM 100 may be selected when referenced in text, an image, a video, as part of an interactive model or diagram, or the like. An example of this feature of IETM 100 is described below with respect to FIGS. 3-9.

In some embodiments, information within IETM 100 may be stored or organized as substantially discrete data modules. A single data module may, for example, include information (e.g., fault isolation procedures, maintenance procedures, physical layouts, or the like) specifically associated with a particular fault code, component, or maintenance procedure. As a representative example, FIG. 1 shows an example first data module 130 for specific fault code 102. First data module 130 includes fault isolation procedure module 104 associated with fault code 102, as well as maintenance procedure module 106 associated with fault isolation procedure module 104. FIG. 1 also shows an example second data module 132 for a specific component. The second data module contains physical layout no and logical layout 114 associated with the specific component. Data modules 130 and 132 are examples, and in other cases a data module may contain other combinations of information. As an example, a data module for a fault may also include one or more physical layouts for components associated with the fault, or may also include portions of supplemental technical information specifically related to the fault. As another example, a data module for a specific component may also include one or more maintenance procedures for the component, or may include portions of supplemental technical information specifically related to the component. In some cases, multiple fault isolation procedures or multiple maintenance procedures may be part of a single data module. In some cases, a single fault isolation procedure or a single maintenance procedure may be part of multiple data modules. Each data module may have links or references to other data modules. As a representative example, first data module 130 may have a fault isolation procedure that includes a hyperlink to component information within second data module 132. The use of data modules to organize data within IETM 100 can allow portions of IETM 100 to be updated or changed without requiring an entirety of IETM 100 to be updated. For example, if a particular fault isolation procedure needs to be updated, only a data module that includes that particular fault isolation procedure may need to be changed, while other data of IETM 100 persists.

FIGS. 3-9 are diagrams representatively illustrating interface 300 presenting an Interactive Electronic Maintenance Manual (IETM) according to some embodiments. Interface 300 may, for example, present IETM 100 and to a user. FIGS. 3-9 illustrate representative experiences a user may have interacting with interface 300, and as such also illustrate features of an IETM as described in this disclosure. Interface 300 may, for example, be implemented as a web page, by an application, in another manner as described previously, or the like. Interface 300 shown in FIGS. 3-9 includes representative examples, and an IETM may be presented using an interface with different features, graphics, layouts, options, UI elements, or the like, than those shown for interface 300.

Figure 3:
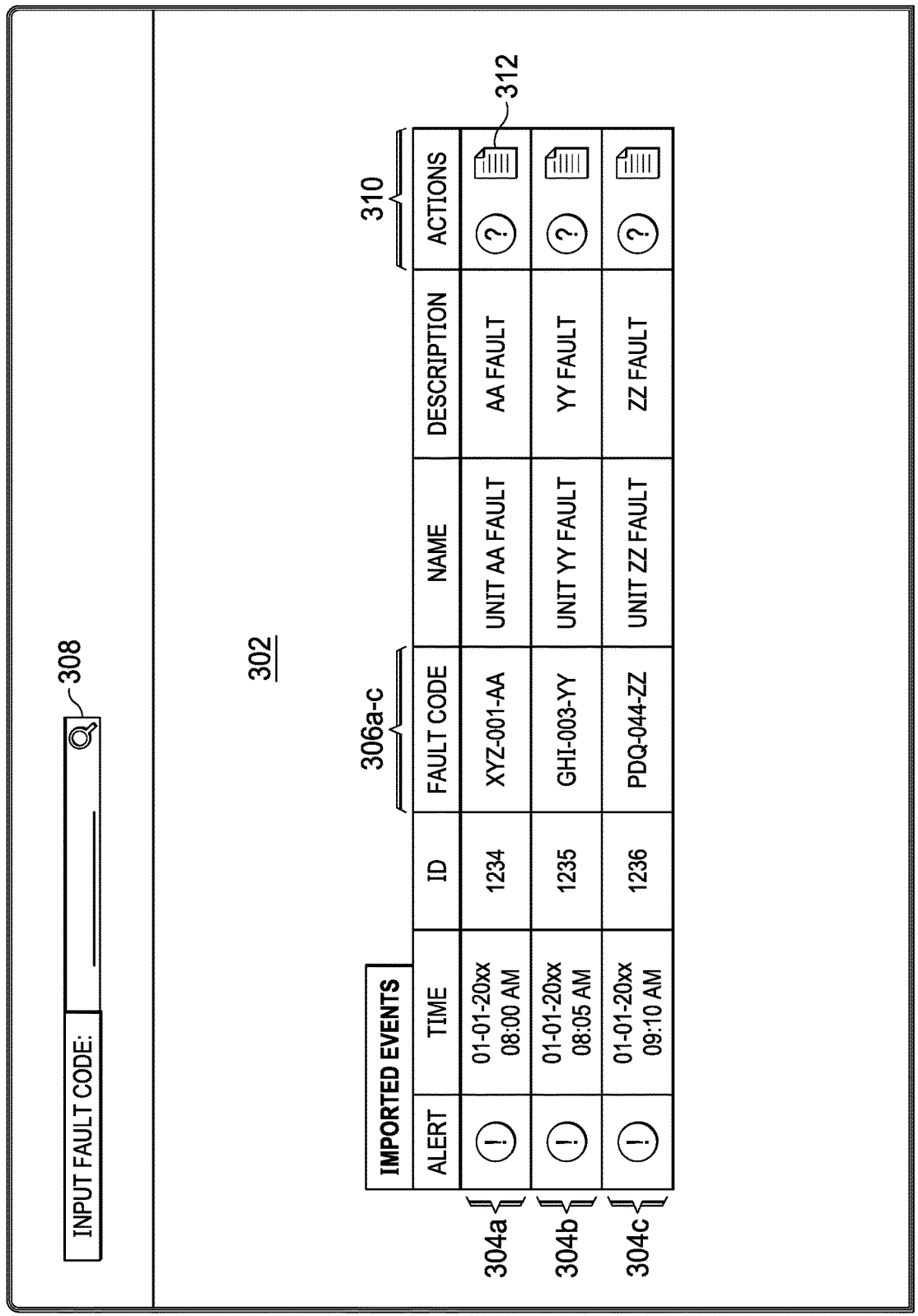
FIG. 3 representatively illustrates an example interface for an IETM showing fault events according to some embodiments.

FIG. 3 shows interface 300 after a series of example fault events 304a-c have been imported from an aircraft. Fault events 304a-c may be transferred to a computer system presenting interface 300 via a network or other technique as described above with respect to FIG. 2. In FIG. 3, the interface 300 includes a pane 302 which displays information about fault events 304a-c, including fault codes 306a-c associated with each fault event. As a representative example, fault event 304a is described as a fault related to a component "Unit AA" and has a fault code 306a of "XYZ-001-AA." Interface 300 may also include, for example, a text field 308 in which a fault code may be manually entered to present information related to that fault code. Interface 300 also presents one or more actions 310 that a user can select. Actions 310 may be hyperlinks that direct a user to additional information or other relevant portions of the IETM. For example, if the user selects the fault isolation procedure icon 312 for fault event 304a, the user is presented with a fault isolation procedure associated with fault code 306a, described in greater detail below.

Figure 4:
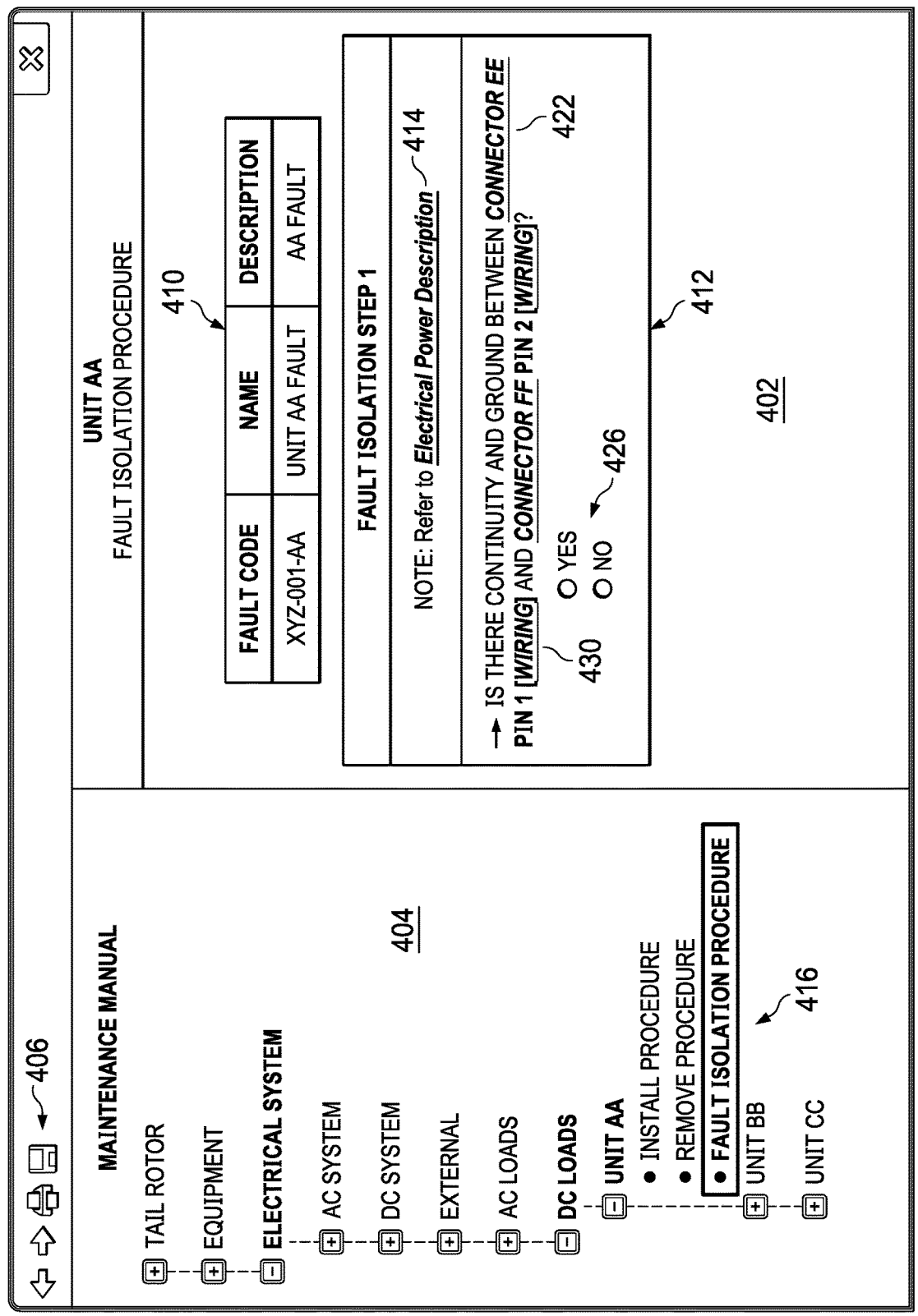
FIG. 4 representatively illustrates an example interface for an IETM showing a fault isolation procedure according to some embodiments.

FIG. 4 shows interface 300 after the user has selected fault isolation procedure icon 312 associated with fault event 304a. Interface 300 shown in FIG. 4 is divided into two panes, a right pane 402 and a left pane 404. In this example, right pane 402 displays fault isolation information 410, and fault isolation procedure 412 for fault code 306a. Fault isolation procedure 412 may be similar to fault isolation procedure module 104 shown schematically in FIG. 1. Left pane 404 displays a directory 416 of contents of IETM with information shown on right pane 402 highlighted. For example, directory 416 is shown as a directory tree opened to "Unit AA" with fault isolation procedure for "Unit AA" highlighted. In some cases, components may be organized in directory 416 by system and subsystem, and the user may be able to select information about a component by navigating within directory 416 to that component. Interface 300 shown in FIGS. 4-9 also includes assorted actions 406, which may include forward or back history actions, print actions, save actions, options or settings, a search function, or the like. In some cases, information displayed in each pane may be configured by, for example, a user or administrator.

Figure 7:
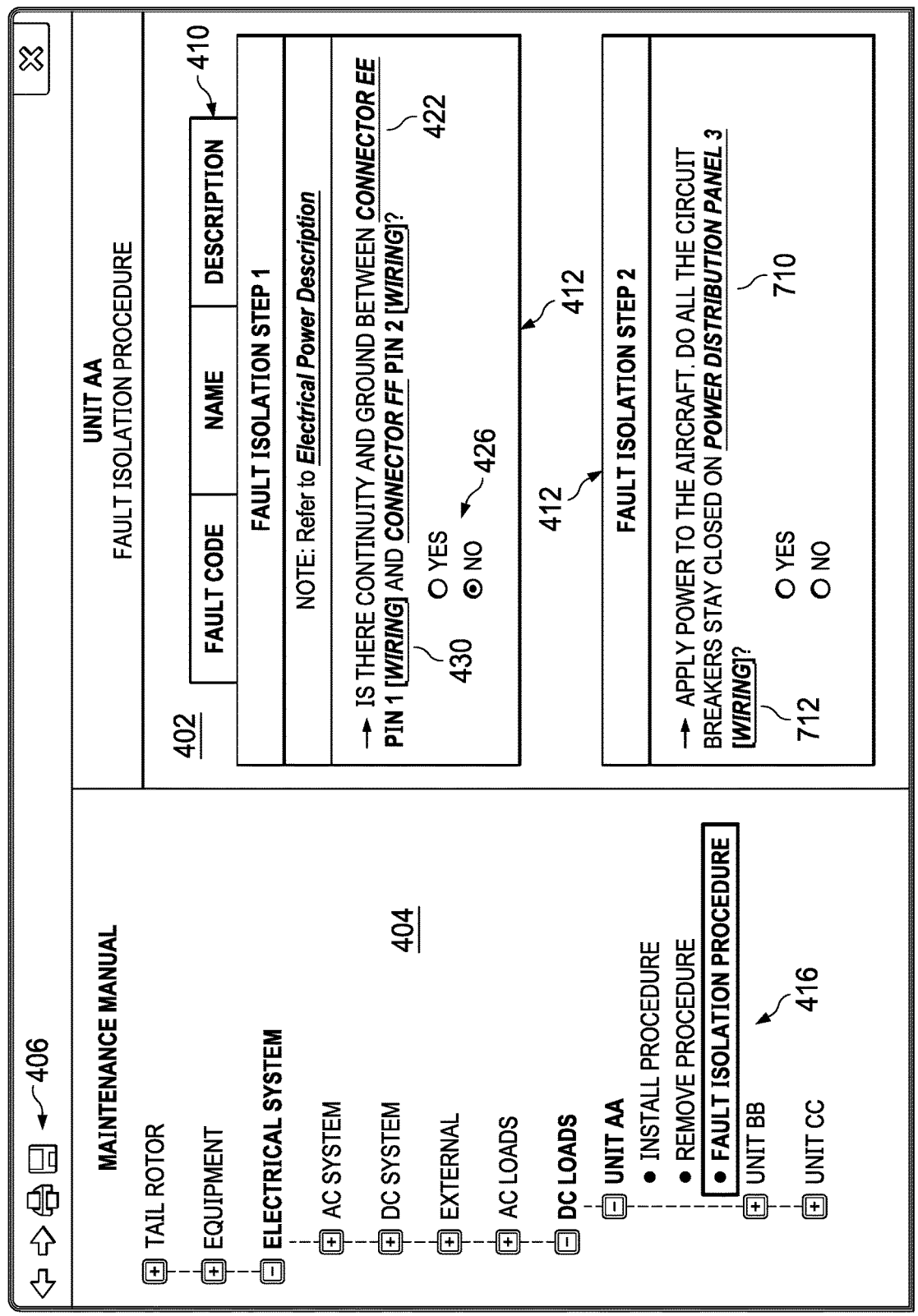
FIG. 7 representatively illustrates an example interface for an IETM showing a fault isolation procedure according to some embodiments.

The example fault isolation procedure 412 displayed in right pane 402 is binary isolation procedure, in which the user is asked a series of yes-or-no questions to isolate cause(s) of, or solution to, a particular fault. For example, step 1 of fault isolation procedure 412 includes two radio buttons 426. Selecting radio button 426 will bring up a particular step 2, depending on which radio button 426 is selected. An example step 2 of fault isolation procedure 412 is shown in FIG. 7.

Fault isolation procedure 412 displayed also includes several hyperlinks that allow a user to access additional information related fault isolation procedure 412. Some hyperlinks may direct the user to supplemental technical information, such as information similar to that in supplemental technical information module 108 described above with respect to FIG. 1. For example, hyperlink 414 shown in FIG. 4 directs the user to supplemental technical information about the electrical power system of the aircraft.

In some cases, each component referenced in the fault isolation procedure 412 is hyperlinked to information about that component. A component hyperlink may direct the user to a page displaying a physical layout, a logical layout, other component details, or the like. For example, hyperlink 422 for "Connector EE" shown in FIG. 4 directs the user to an interactive physical layout 510, described below with respect to FIG. 5. Physical fault isolation procedure 412 may also include hyperlinks to interactive logical layouts. For example, "wiring" hyperlink 430 for "Connector EE" shown in FIG. 4 directs the user to an example logical layout implemented as an interactive wiring diagram 610, described below with respect to FIG. 6. In some embodiments, interface 300 of the IETM includes cross-referenced hyperlinks between the fault isolation procedure, components, interactive physical layouts, and interactive logical layouts. Having hyperlinks to both physical layouts and logical layouts within the displayed fault isolation procedure can allow a user to more easily or more efficiently locate referenced components on an actual aircraft, or perform steps of a fault isolation procedure.

Figure 5:
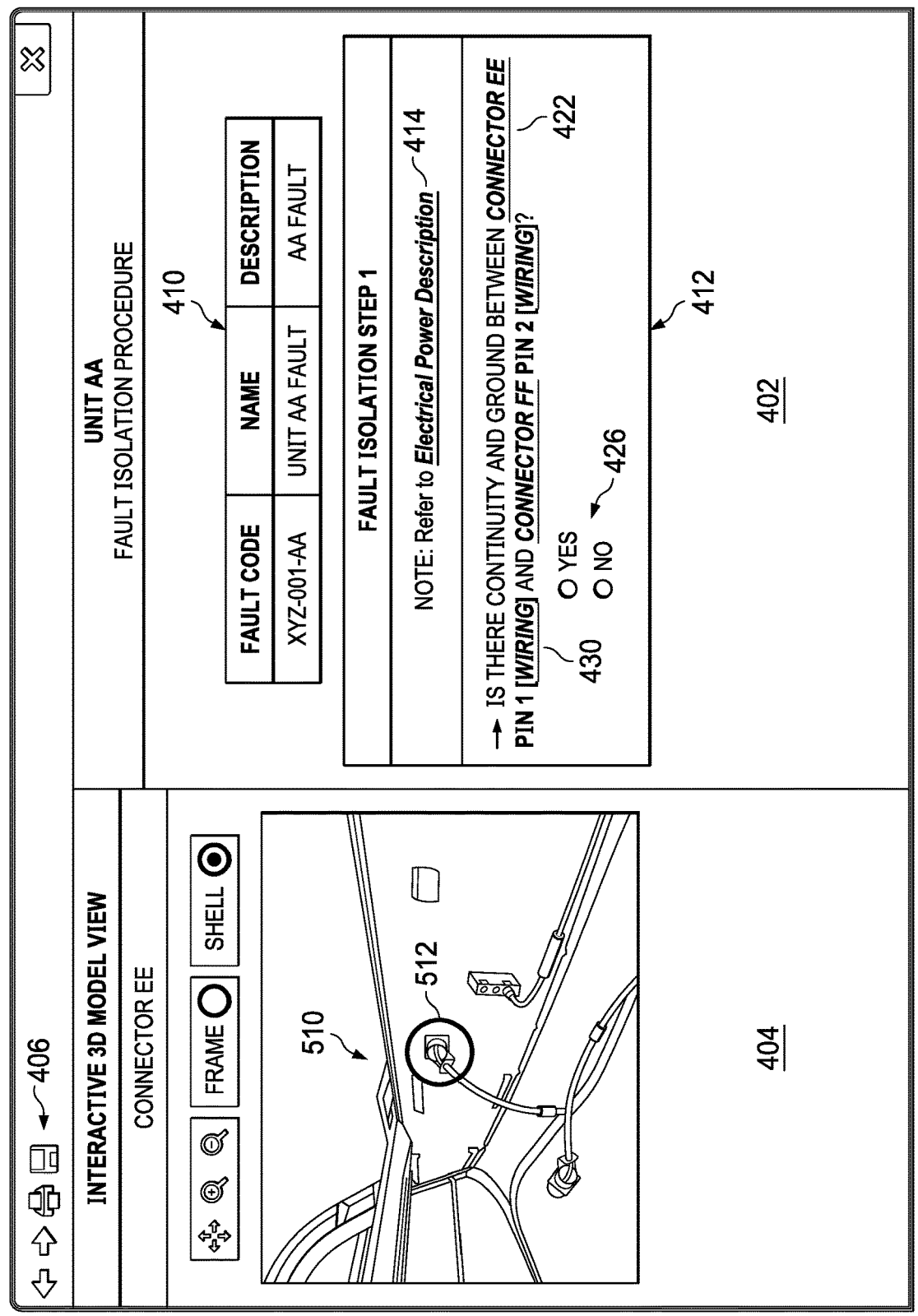
FIG. 5 representatively illustrates an example interface for an IETM showing an interactive physical layout according to some embodiments.

FIG. 5 shows interface 300 after the user has selected hyperlink 422 for a component "Connector EE" displayed in fault isolation procedure 412. After selecting hyperlink 422, left pane 404 displays an interactive physical layout 510. Physical layout 510 may be similar to physical layout no representatively illustrated schematically in FIG. 1. In this example shown in FIG. 5, the selected component is "Connector EE." Physical layout 510 displays a portion of the aircraft with the selected component ("Connector EE") highlighted by indicator 512. In other cases, the selected component may be highlighted by having a different color, by a label, having an outline around the selected component, or the like. Physical layout 510 may display only a selected component or may display multiple components. In some cases, physical layout 510 may include controls for display options (e.g., wireframe display, shell display, transparent aircraft body, or the like) or other settings.

In some embodiments, physical layout 510 is an interactive 3D model of some or all of an aircraft, including at least a selected component. In some cases, the user can control physical layout 510 using an input device of a computer system (e.g., a mouse, a touchscreen, or the like). For example, the user may be able to control an interactive 3D model to pan, zoom in, zoom out, rotate, or the like, in order to show different 3D views of the aircraft or components. In this manner, the displayed 3D view of the interactive 3D model may be controlled by the user. In some embodiments, the user may be able to select a component shown on physical layout 510 to display information about that component. The component information may, for example, appear in right pane 402 or in a pop-up display, and may include component details, a logical layout for that component, the component shown in directory 416, or other information. In some cases, other aircraft details or components, such as inspection zones, access panels, wire harnesses, landmarks, or the like, may be highlighted or labeled in physical layout 510 to assist in the fault isolation procedure.

FIG. 5 shows interface 300 after a user has selected hyperlink 422 for the component "Connector EE" displayed in fault isolation procedure 412. After selecting hyperlink 422, left pane 404 displays an interactive physical layout 510. Physical layout 510 may be similar to physical layout no representatively illustrated schematically in FIG. 1. In this example shown in FIG. 5, the selected component is "Connector EE". Physical layout 510 displays a portion of the aircraft with a selected component ("Connector EE") highlighted by indicator 512. In other cases, the selected component may be highlighted by having a different color, by a label, having an outline around the selected component, or the like. Physical layout 510 may display a selected component or may display multiple components. In some cases, physical layout 510 may include controls for display options (e.g., wireframe display, shell display, transparent aircraft body, or the like) or other settings.

Figure 6:
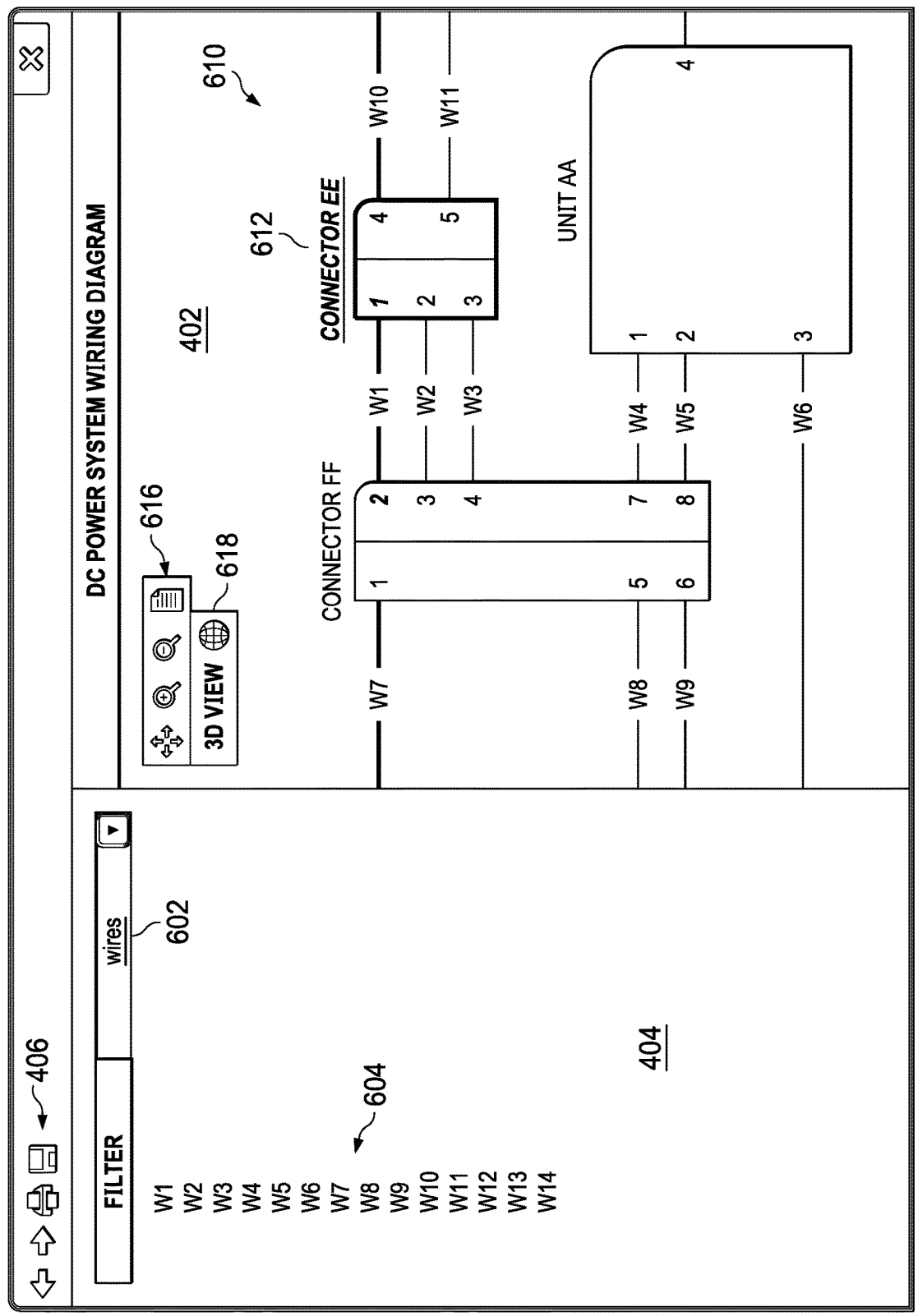
FIG. 6 representatively illustrates an example interface for an IETM showing an interactive logical layout according to some embodiments.

FIG. 6 shows interface 300 after a user has selected "wiring" hyperlink 430 for the component "Connector EE" displayed in fault isolation procedure 412. After selecting hyperlink 430, right pane 402 displays an interactive logical layout 610, and left pane 404 displays a searchable list 604 of components. Logical layout 610 may be similar to logical layout 114 representatively illustrated schematically in FIG. 1. In this example shown in FIG. 6, the selected component is "Connector EE". Logical layout 610 displays a portion of a wiring diagram for the aircraft with the selected component 612 ("Connector EE") highlighted. In other cases, selected component 612 may be highlighted by having a different color, by a label, having an outline around the selected component, or the like. Logical layout 610 may also highlight other components, such as other components connected to selected component 612 or other components relevant to fault isolation procedure 412. In some embodiments, a user is able to select any component shown within logical layout 610 to display information about that component. Logical layout 610 may also include hyperlinks to show other information, such as hyperlink 616 to return to a previously-shown fault isolation procedure 412, or hyperlink 618 to display physical layout 510 for the selected component. In some cases, logical layout 610 may include controls for display options (e.g., pan, zoom in, zoom out, or the like) or other settings.

Searchable list 604 displayed in the right pane 404 may allow a user to display a list of components. The components may be searched or filtered by type, name, fault code, or other criteria. Searchable list 604 may also, for example, show all components currently displayed in logical layout 610, show a list of all components similar to directory 416, or the like. In some cases, a user may select a component from searchable list 604, and in response logical layout 610 displays or highlights the selected component.

FIG. 7 representatively illustrates fault isolation procedure 412 of FIG. 4 after a user has selected an answer to the yes-or-no question presented in step 1. In this example, the user has selected "NO" as the answer to the yes-or-no question presented in step 1, and is then shown step 2, in which another yes-or-no question is presented. Similar to step 1 of fault isolation procedure 412, steps of fault isolation procedure 412, including step 2, may include hyperlinks associated with relevant components. For example, step 2 includes a hyperlink 710 for a component "Power Distribution Panel 3" that directs the user to a physical layout for that component. Step 2 also includes hyperlink 712 that directs the user to a logical layout for the component "Power Distribution Panel 3."

Figure 8:
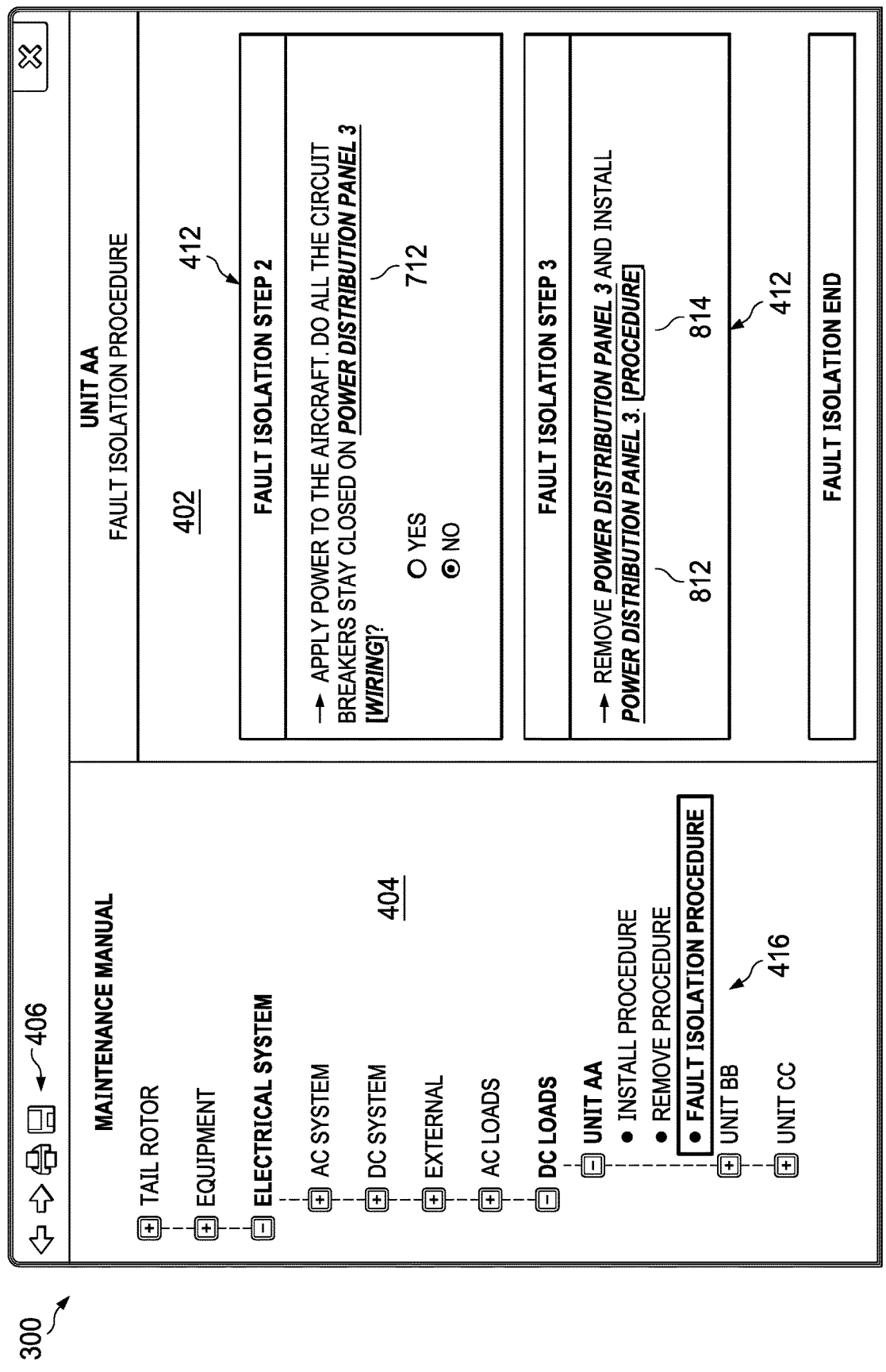
FIG. 8 representatively illustrates an example interface for an IETM showing a fault isolation procedure according to some embodiments.

FIG. 8 shows fault isolation procedure 412 of FIG. 7 after a user has selected an answer to the yes-or-no question presented in step 2. In this example, the user has selected "NO" as the answer to the yes-or-no question presented in step 2, and is then shown step 3. In this example fault isolation procedure, step 3 is a final step, which in this case instructs the user to follow a procedure. Similar to other steps of fault isolation procedure 412, step 3 includes hyperlinks associated with relevant components. For example, step 3 includes hyperlink 812 for a component "Power Distribution Panel 3" that directs the user to a physical layout for that component, similar to hyperlink 712. Step 3 also includes hyperlink 814 that directs the user to additional information about the procedure described in step 3. Fault isolation procedure 412 shown in FIGS. 4-8 is a representative example, and other fault isolation procedures associated with other fault codes, fault events, or components may have different characteristics, information, hyperlinks, or features than shown in example fault isolation procedure 412.

Figure 9:
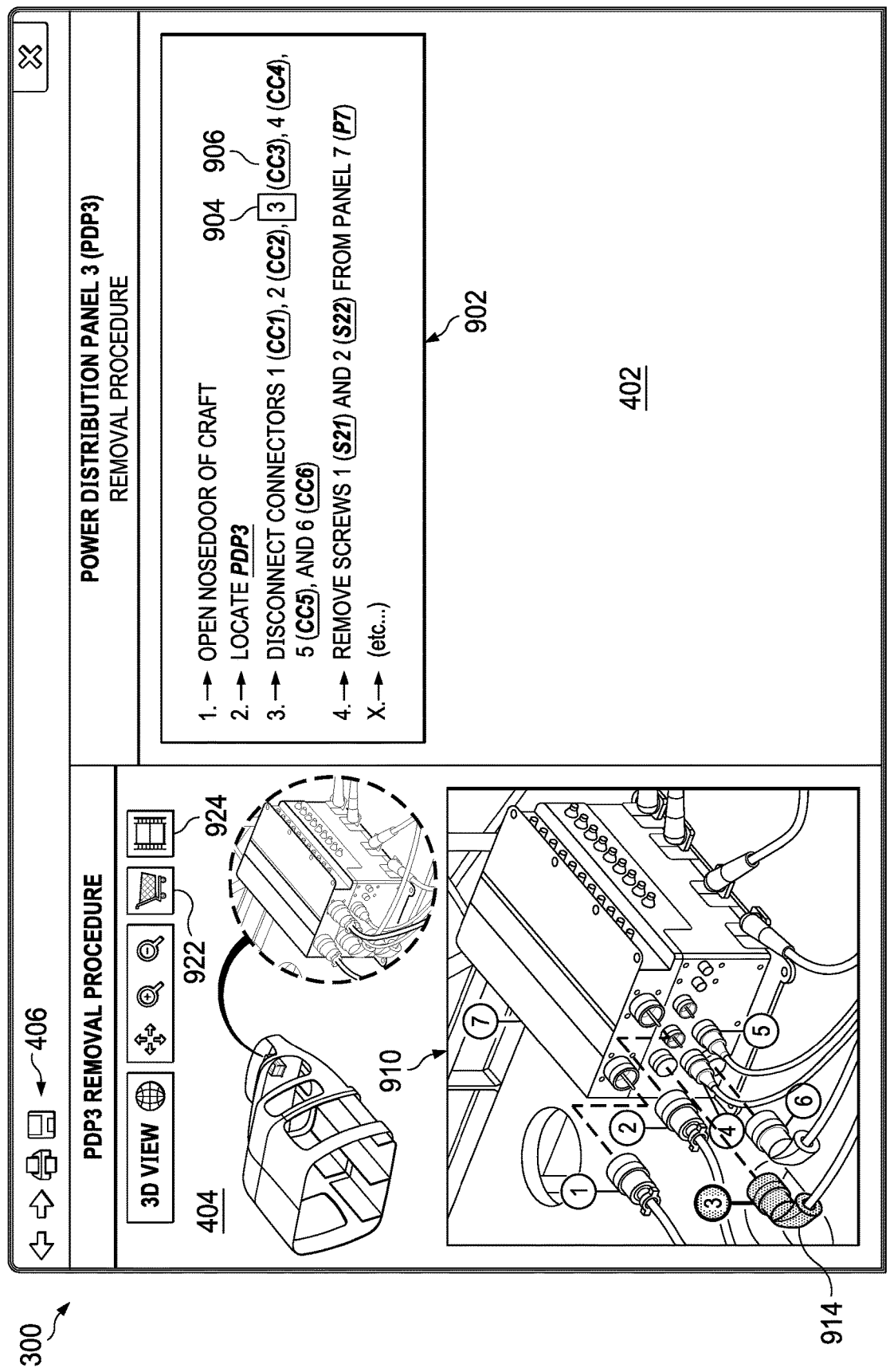
FIG. 9 representatively illustrates an example interface for an IETM showing a maintenance procedure according to some embodiments.

FIG. 9 shows interface 300 after a user has selected "procedure" hyperlink 814 for step 3 of fault isolation procedure 412 representatively illustrated in FIG. 8. After selecting hyperlink 814, right pane 402 displays a procedure 902, and left pane 404 displays interactive images 910. Procedure 902 may present detailed instructions for performing a procedure associated with "procedure" hyperlink 814. One or more components referenced in procedure 902 may have hyperlinks (e.g., hyperlink 906) that may link to a physical layout for that component, a logical layout for that component, or other additional information about that component. Interactive images 910 may include one or more images showing components related to procedure 902. For example, interactive images 910 may include images showing a location of components on an aircraft, images showing one or more procedural steps, or other images. In some cases, one or more components shown in interactive images 910 are selectable by the user. For example, a user may select a component (e.g., example selected component 914) to show or highlight that component within interactive images 910, and additional information about that selected component. In some cases, a selected component may also be highlighted if it appears within procedure 902 (e.g., example selected component 904). In some cases, the user may select a component within procedure 902, and the selected component may be highlighted within interactive images 910. In some cases, interactive images 910 may include links to a physical layout or a logical layout for the components shown. Interactive images 910 may also include purchase links (e.g., purchase link 922) that the user can select to display a web page, pop-up display, or the like, for purchasing one or more components shown. In some cases, one or more components may be automatically filled out in a purchase form, which can reduce purchasing errors. In some cases, a purchase form may be automatically filled out with stored information such as the user's identification, address, payment information, or the like. In some cases, interactive images 910 may include a video link (e.g., video link 924) that will display one or more videos illustrating one or more steps of procedure 902.

Figure 10:
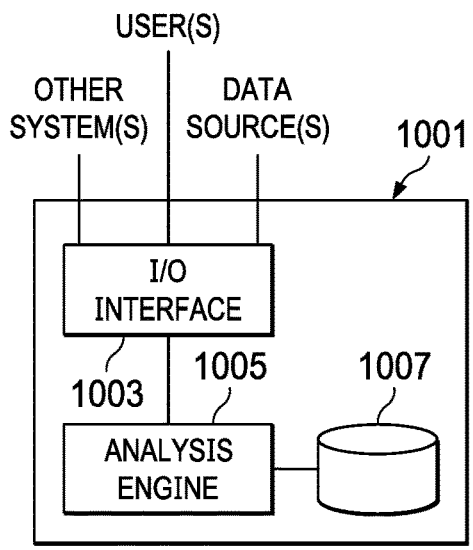
FIG. 10 representatively illustrates a computer system according to some embodiments.

FIG. 10 illustrates a computer system 801 according to some embodiments. Computer system 1001 can be configured for performing one or more functions with regard to operation or implementation of an IETM such as, e.g., IETM 100, a computing system such as computing system 202, server 210, data storage system 212, or other portions of system 200, as described herein. Further, processing or analysis can be partly or fully performed by computer system 1001. Computer system 1001 can be partly or fully integrated with other computer systems. Computer system

1001 can include an input/output (I/O) interface 1003, an analysis engine 1005, and a database 1007. Alternative, conjunctive, or sequential embodiments can combine or distribute I/O interface 1003, analysis engine 1005, and database 1007, as desired. Embodiments of computer system 1001 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while representative embodiments are described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

I/O interface 1003 can provide a communication link between external users, systems, and data sources and components of computer system 1001. I/O interface 1003 can be configured for allowing one or more users to input information to computer system 1001 via any input device, whether now known or hereafter derived in the art. Examples can include a keyboard, mouse, touch screen, or any other desired input device. I/O interface 1003 can be configured for allowing one or more users to receive information output from computer system 1001 via any known output device. Examples can include a display monitor, an electronic display, a printer, a cockpit display, or any other desired output device. I/O interface 1003 can be configured for allowing other systems to communicate with computer system 1001. For example, I/O interface 1003 can allow one or more remote computers to access information, input information, and/or remotely instruct computer system 1001 to perform one or more of the tasks described herein. I/O interface 1003 can be configured to interact with one or more networks such as those described herein. I/O interface 1003 can be configured for allowing communication with one or more remote data sources. For example, I/O interface 1003 can allow one or more remote data source(s) to access information, input information, or remotely instruct computer system 1001 to perform one or more of the tasks described herein.

Database 1007 provides persistent data storage for computer system 1001. Although the term "database" is primarily used, a memory or other suitable data storage arrangement may provide functionality of database 1007. In alternative or conjunctive embodiments, database 1007 can be integral to or separate from computer system 1001, and can operate on one or more computers. Database 1007 may be configured to provide non-volatile data storage for any information suitable to support operation of an IETM or computing system as described herein, including various types of data discussed herein. Analysis engine 1005 can include various combinations of one or more processors, memories, software components, or computer-readable mediums.

Figure 11:
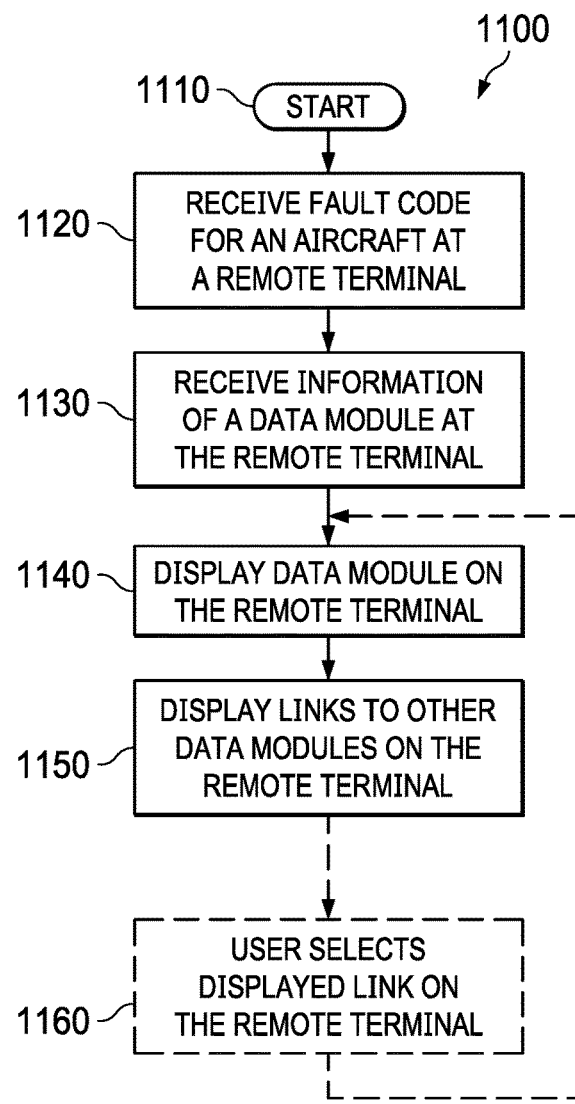
FIG. 11 representatively illustrates a method for implementing an IETM according to an embodiment.

In accordance with an embodiment as representatively illustrated in FIG. 11, a method 1100 for implementing an IETM begins 1110 with a step 1120 of receiving at a remote terminal a fault code for an aircraft. After receiving the fault code, in step 1130 a data module is received at the remote terminal. The data module may, for example, be received from a server. The particular data module that is received may be selected from a plurality of data modules based on the fault code or based on user input. The plurality of data modules may include one or more data modules associated with the fault code and/or one or more data modules associated with components of the aircraft. The data modules associated with the fault code may include a module associated with fault isolation procedures and/or a module associated with a maintenance procedure. The data modules associated with components of the aircraft may include a module associated with the physical layout of the aircraft and/or a module associated with a logical layout of the aircraft. The physical layout may be, for example, a 3D model. The logical layout may be, for example, a wiring diagram. The data module or information within the data module is displayed on the remote terminal in step 1140. In step 1150, links associated with other data modules are displayed on the remote terminal. In some cases, a link may be associated with a particular component. The links may also be displayed as part of step 1140. Optionally, in step 1160 if a user selects a link associated with a different data module, the IETM may optionally return to step 1140 in which the different data module is displayed on the remote terminal.

Figure 12:
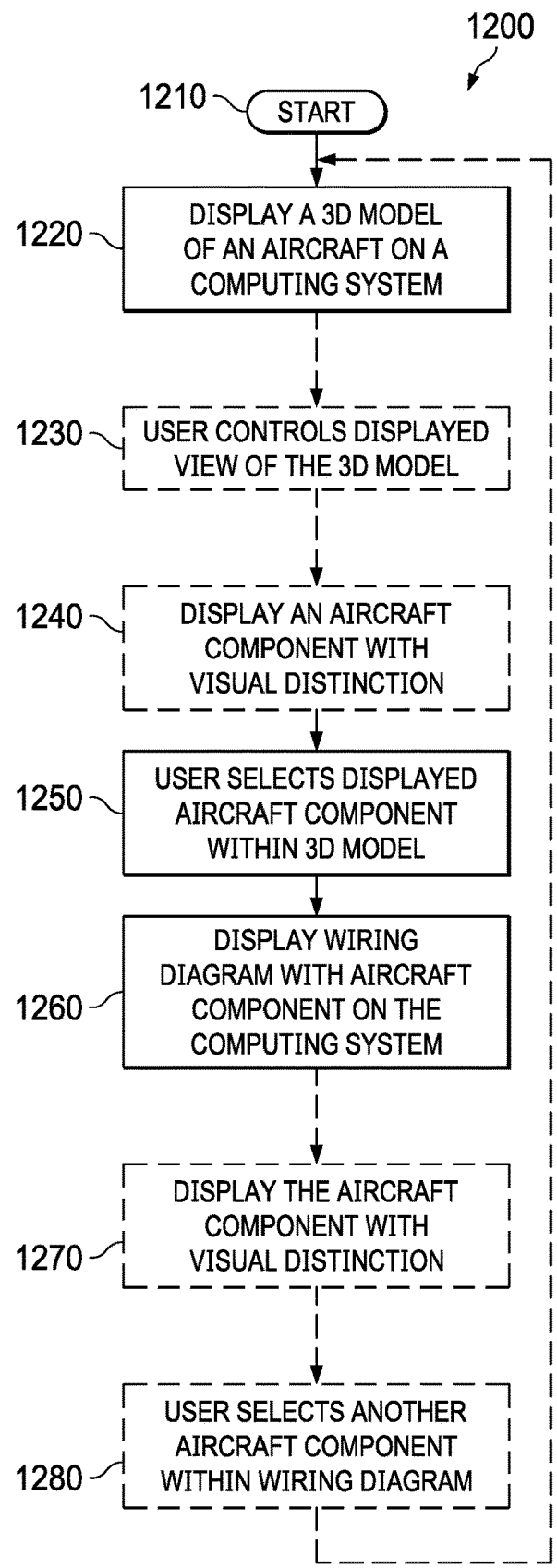
FIG. 12 representatively illustrates another method for implementing an IETM according to an embodiment.

In accordance with an embodiment as representatively illustrated in FIG. 12, a method 1200 for implementing an IETM begins 1210 with a step 1220 of displaying a 3D model of an aircraft on a computing system. In step 1230 a user is optionally able to control the displayed view of the 3D model. For example, a user may be able to rotate, pan, zoom, or otherwise control the view of the 3D model that is displayed. In step 1240, the 3D model of the aircraft is optionally displayed with one or more components of the aircraft visually distinguished. For example, a visually distinguished component may have a different color, shade, outline, texture, opacity, etc. than other components shown in the 3D model. In some cases, the visually distinguished component may be associated with a fault code of the aircraft or a fault isolation procedure. In step 1250, the user selects one of the components displayed in the 3D model. For example, one of the visually distinguished components may be selected. Upon selection of a component, in step 1260 a wiring diagram with the selected component is displayed on the computer system. In step 1270, the wiring diagram with the selected component is optionally displayed with one or more components of the aircraft visually distinguished, such as the selected component. In step 1280, the user optionally selects one of the components displayed in the wiring diagram. Upon selecting a component in the wiring diagram, the IETM may return to step 1220 in which a 3D model of the aircraft including the newly selected component is displayed on the computing system.

As used herein, the terms "comprises," "comprising," "includes," "including," "has," "having," or any contextual variant thereof, are intended to reference a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

Any suitable programming language(s) can be used to implement the routines, methods, programs, or instructions of embodiments described herein, including; e.g., C, C#, C++, Java, Ruby, MATLAB, Simulink, assembly language, or the like. Different programming techniques may be employed, such as procedural or object-oriented ontologies. Any routine can execute on a single computer processing device or multiple computer processing devices, a single computer processor, or multiple computer processors. Data may be stored in a single storage medium or distributed across multiple storage mediums, and may reside in a single database or multiple databases (or other data storage techniques).

Although steps, operations, or computations may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process, such as an operating system, kernel, daemon, or the like. The routines can operate in an operating system environment or as stand-alone routines. Functions, routines, methods, steps, or operations described herein can be performed in hardware, software, firmware, or any combination thereof.

Embodiments described herein may be implemented in the form of control logic in software or hardware, or a combination of both. Control logic may be stored in an information storage medium, such as a computer-readable medium, as a plurality of instructions adapted to direct an information processing device to perform a set of steps disclosed in various embodiments. Based on the disclosure and teachings provided herein, a person of ordinary skill in the art will appreciate other ways or methods to implement similar, or substantially similar, functionality.

It is also within the spirit and scope herein to implement, in software, programming, or other steps, operations, methods, routines, or portions thereof described herein, where such software programming or code can be stored in a computer-readable medium and can be operated on by a processor to permit a computer to perform any of the steps, operations, methods, routines, or portions thereof described herein. Embodiments may be implemented using software programming or code in one or more general purpose digital computers, by using, e.g., application specific integrated circuits (ASICs), programmable logic devices, field programmable gate arrays (FPGAs), or optical, quantum, or nano-engineered systems, components, or mechanisms. In general, functions disclosed herein may be achieved by any means, whether now known or hereafter derived in the art. For example, distributed or networked systems, components, or circuits can be used. In another example, communication or transfer (or otherwise moving from one place to another) of data may be wired, wireless, or accomplished by any other means.

A "computer-readable medium" may be any medium that can contain, store, communicate, propagate, or transport a program for use by or in connection with an instruction execution system, apparatus, system, or device. The computer-readable medium can be, but is not limited to, an electronic, magnetic, optical, electromagnetic, infrared, or semiconductor system, apparatus, system, device, propagation medium, or computer memory. Such computer-readable medium will generally be machine readable and include software programming or code susceptible to being human readable (e.g., source code) or machine readable (e.g., object code).

A "processor" includes any hardware system, mechanism or component that processes data, signals, or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," or the like. Portions of processing may be performed at different (or same) times and at different (or same) locations by different (or same) processing systems.

It will also be appreciated that one or more elements illustrated in the Figures may also be implemented in a more-separated or more-integrated manner, or even removed or rendered inoperable in certain cases, as may be useful in accordance with particular applications and embodiments. Additionally, any signal lines or arrows in the Figures should be considered only as representative, and therefore not limiting, unless otherwise specifically noted.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "or the like," "in a representative embodiment," "in one embodiment," "in another embodiment," or "in some embodiments." Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to a same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially similar results in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:

1. A system, comprising:
   an input/output interface;
   a processor; and
   a non-transitory computer-readable medium having instructions stored thereon that, when executed, cause the processor to:
   receive a fault code;
   in response to receiving the fault code, display on the input/output interface a first component of an aircraft that is associated with the fault code and a first hyperlink associated with the first component;
   upon selection by a user of the first hyperlink, display a fault isolation procedure associated with the fault code, wherein the displayed fault isolation procedure comprises a second hyperlink associated with the first component and a third hyperlink associated with the first component, wherein the fault isolation procedure is displayed in a first region of the input/output interface;
   upon selection by a user of the second hyperlink associated with the first component, display a physical layout of the aircraft, wherein the physical layout displays the first component and other components, wherein the displayed first component is distinctly indicated relative to the other displayed components, wherein the physical layout of the aircraft is displayed in a second region of the input/output interface and the fault isolation procedure remains displayed in the first region of the input/output interface; and
   upon selection by the user of the third hyperlink associated with the first component, display a first wiring diagram of the aircraft and a list of components of the aircraft, wherein the first wiring diagram displays the first component, other components, and connections thereto, wherein the displayed first component and the displayed connections to the first component are distinctly indicated relative to the other displayed components and the other displayed connections, wherein the first wiring diagram is displayed in the first region of the input/output interface and the list of components is displayed in the second region of the input/output interface, wherein the list of components displays the first component.

2. The system of claim 1, wherein the fault code is received from the aircraft.

3. The system of claim 1, wherein the physical layout of the aircraft is an interactive $_3$D model.

4. The system of claim 1, wherein the displayed fault isolation procedure comprises a fourth hyperlink associated with a second component, and wherein the instructions, when executed, further cause the processor to: upon selection by the user of a the fourth hyperlink associated with the second component, display the first wiring diagram of the aircraft in which the second component and connections to the second component are distinctly indicated relative to other displayed components and other displayed connections.

5. The system of claim 1, wherein the instructions, when executed, further cause the processor to:
   display on the input/output interface a first maintenance procedure that is associated with the first component.

6. A method, comprising:
   receiving, at a remote terminal, a fault code for an aircraft;
   receiving, at the remote terminal and from a server, a fault code data module of a plurality of data modules, wherein the fault code data module corresponds to the received fault code and wherein the fault code data module comprises a fault isolation procedure corresponding to the received fault code; and
   displaying at least one step of the fault isolation procedure of the fault code data module in an interface of the remote terminal, comprising displaying a first user-selectable link to a physical layout module and a second user-selectable link to a logical layout module, wherein the first user-selectable link is selectable to display a physical layout of the aircraft in which a first component associated with the one step of the fault isolation procedure is visually distinguished relative to a second component that is not associated with the one step of the fault isolation procedure, wherein the physical layout simultaneously shows the first component and the second component, wherein the physical layout is displayed adjacently to the one step of the fault isolation procedure, and wherein the second user-selectable link is selectable to display a logical layout of the aircraft in which the first component associated with the one step of the fault isolation procedure is visually distinguished relative to a third component that is not associated with the one step of the fault isolation procedure, wherein the logical layout simultaneously shows the first component and the third component.

7. The method of claim 6, wherein the fault code data module further comprises a maintenance procedure corresponding to the received fault code.

8. The method of claim 6, wherein the logical layout comprises an interactive wiring diagram.

9. The method of claim 6, wherein the physical layout comprises an interactive $_3$D model.

10. A method, comprising:
    displaying a view of a $_3$D model of an aircraft on a computing system, wherein the view of the $_3$D model is controllable by a user of the computing system, wherein:
    the $_3$D model comprises a first set of aircraft components comprising at least one aircraft component, wherein the first set of aircraft components is associated with a first fault code of the aircraft;
    the aircraft components of the first set of aircraft components that are displayed in the view of the $_3$D model are visually distinguished from other aircraft components displayed in the view of the $_3$D model; and each aircraft component of the first set of aircraft components is selectable by the user of the computing system within the $_3$D model; and upon selection of a first aircraft component of the first set of aircraft components within the $_3$D model, displaying an interactive wiring diagram for the aircraft, wherein at least the first aircraft component of the first set of aircraft components is visually distinguished from a second aircraft component of the first set of aircraft components in the interactive wiring diagram when both the first aircraft component and the second aircraft component are simultaneously displayed within the interactive wiring diagram, wherein each aircraft component displayed within the interactive wiring diagram is selectable by the user of the computing system.

11. The method of claim 10, wherein the first aircraft component of the first set of aircraft components is associated with a first fault isolation procedure associated with the first fault code of the aircraft.

12. The method of claim 10, further comprising:
upon selection of a third aircraft component within the interactive wiring diagram, displaying the $_3$D model of the aircraft, wherein at least the third aircraft component is visually distinguished from a fourth aircraft component in the $_3$D model.

13. The method of claim 10, further comprising:
displaying a second fault isolation procedure on the computing system; and
upon selection of a fifth aircraft component within second fault isolation procedure, displaying the $_3$D model of the aircraft, wherein at least the fifth aircraft component is visually distinguished from a sixth aircraft component in the $_3$D model.

14. The method of claim 6, wherein the physical layout and the logical layout are displayed simultaneously on the interface of the remote terminal.

15. The method of claim 6, wherein the displayed logical layout also displays a second component that is logically associated with the first component, wherein the second component is visually distinguished.

16. The method of claim 6, wherein displaying the at least one step of the fault isolation procedure of the fault code data module in an interface of the remote terminal further comprises displaying a first yes-or-no question having two or more user-selectable responses, wherein selecting one of the user-selectable responses displays a different step of the fault isolation procedure comprising a second yes-or-no question, wherein the different step that is displayed is based on the selected user-selectable response.

17. The system of claim 1, wherein the first wiring diagram comprises a fifth hyperlink, and wherein the instructions, when executed, further cause the processor to:
upon selection by the user of the fifth hyperlink, display the fault isolation procedure.

18. The system of claim 1, wherein the displayed list of components displays a third component, and wherein the instructions, when executed, further cause the processor to:
upon selection by the user of the third component in the displayed list of components, display a second wiring diagram of the aircraft, wherein the second wiring diagram displays the third components and other components, wherein the third component and connections to the third component are distinctly indicated relative to the other displayed components and other displayed connections.

19. The method of claim 10, wherein the view of the $_3$D model and the interactive wiring diagram are displayed adjacently on the computing system.

20. The method of claim 10, wherein the interactive wiring diagram comprises a searchable list of aircraft components.

* * * * *